(12) United States Patent
Watanabe et al.

(10) Patent No.: US 6,303,250 B1
(45) Date of Patent: Oct. 16, 2001

(54) SECONDARY BATTERY INCLUDING AN ELECTROLYTIC SOLUTION WITH AN ORGANIC ADDITIVE

(75) Inventors: Shoichiro Watanabe, Nara; Kazuya Iwamoto, Osaka; Atsushi Ueda, Osaka; Jun Nunome, Osaka; Hizuru Koshina, Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/289,468

(22) Filed: Apr. 9, 1999

(51) Int. Cl.$^7$ ....................................................... H01M 6/24
(52) U.S. Cl. ................................................. 429/306; 429/303
(58) Field of Search ..................................... 429/328, 303, 429/306

(56) References Cited

U.S. PATENT DOCUMENTS

| | | | |
|---|---|---|---|
| 4,879,192 | * | 11/1989 | Nishimura ............................ 429/198 |
| 5,780,182 | * | 7/1998 | Barker ................................... 429/197 |
| 5,888,666 | * | 3/1999 | Kawakami ............................ 429/62 |
| 6,074,777 | * | 6/2000 | Reimers ................................ 429/61 |

FOREIGN PATENT DOCUMENTS

| | | | |
|---|---|---|---|
| 2216898 | * | 3/1999 | (CA) ............................. H01M/10/24 |
| 11185809 | * | 7/1999 | (JP) ................................ H01M/4/02 |
| 99/28987 | * | 6/1999 | (WO) .............................. H01M/1/40 |

* cited by examiner

Primary Examiner—Gabrielle Brouillette
Assistant Examiner—Mark Ruthkosky
(74) Attorney, Agent, or Firm—Ratner & Prestia

(57) ABSTRACT

A battery excellent in high temperature storage characteristic is presented. It comprises a positive electrode containing a positive electrode active material, a negative electrode containing a negative electrode material, a nonaqueous solvent, and an electrolytic solution containing at least one of organic compounds expressed in formula 1 and formula 2. The positive electrode active material has an oxide compound containing a lithium atom, and the negative electrode material has a material capable of storing and releasing a lithium ion.

Formula 1

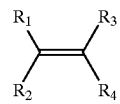

Formula 1 where $R_1$, $R_2$, $R_3$, $R_4$ are individually at least one selected from the group consisting of H, aryl group, and aryl group having a functional group containing a substituent having an electron attracting property, and the number of H is three or less.

Formula 2

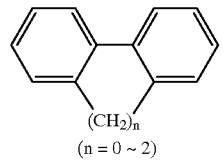

Formula 2

$(CH_2)_n$
$(n = 0 \sim 2)$

33 Claims, 1 Drawing Sheet

SECONDARY BATTERY INCLUDING AN ELECTROLYTIC SOLUTION WITH AN ORGANIC ADDITIVE

FIELD OF THE INVENTION

The present invention relates to a secondary battery, and more particularly to a secondary battery using a nonaqueous electrolytic solution.

BACKGROUND OF THE INVENTION

Recently, the portable and cordless trend is rapidly promoted in electronic appliances such as AV appliances and personal computers. As the driving power source for these electronic appliances, there is a mounting demand for secondary batteries having high energy density in spite of small size and light weight. In particular, the nonaqueous electrolyte secondary battery with negative electrode using lithium as active material is highly expected as a battery having high voltage and high energy density.

In this battery, the active material for the positive electrode is a metal oxide containing lithium showing a voltage in a class of 4 V such as $LiCoO_2$, $LiNiO_2$, or $LiMn_2O_4$, and the negative electrode is a carbon material which is capable of intercalating and deintercalating lithium.

The electrolytic solution to be used in such nonaqueous electrolyte battery is, for example, a nonaqueous solvent such as ethylene carbonate, propylene carbonate or other cyclic ester, tetrahydrofuran or other cyclic ether, dimethoxy ethane or other noncyclic ether, dimethyl carbonate, methyl propionate or other noncyclic ester, or a mixed solvent thereof.

Lately, the secondary batteries are expected to be used in various applications, not only in portable data terminals (for example, cellular phones and notebook type personal computers), but also in electric vehicles and power storage. Accordingly, applications in severe environments are increasing. In particular, when used as the power source for an electric vehicle, the battery may be exposed to high temperature of over 80 in summer, and the battery having a high reliability even in such severe ambient temperature is demanded.

In these secondary batteries, accordingly, a nonaqueous organic solvent not electro chemical decomposed at high voltage is used as the electrolyte solution. Such batteries are particularly heightened in oxidation catalytic function of the positive electrode in high temperature environment. As a result, the nonaqueous solvent is electro chemical oxidized on the surface of the positive electrode, the composition of the electrolyte solution is changed, the discharge characteristic deteriorates due to drop of conductivity of the electrolytic solution, and decomposition products (for example, carbon dioxide) are formed as gas. In a worst case, consequently, leakage of electrolyte solution occurred.

It is hence an object of the invention to present an excellent battery having a high reliability even when stored at high temperature.

SUMMARY OF THE INVENTION

The secondary battery of the invention comprises a positive electrode active material having a transition metal complex oxide containing lithium, a negative electrode having a material capable of storing and releasing lithium, and a nonaqueous electrolytic solution. The electrolytic solution has an organic compound expressed in formula 1 or formula 2. The organic compound expressed in formula 1 includes 1,2-diphenyl ethylene, cis-stilbene, trans-stilbene, triphenyl ethylene, tetraethyl phenylene, p-fluoro-cis-stilbene, etc. The organic compound expressed in formula 2 includes biphenylene, 9,10-dihydrophenanthrene, etc.

Preferably, these organic compounds are contained in a range of about 0.1 wt. % to about 20 wt. % in the total weight of the electrolyte solution.

In this constitution, the resistance of the electrolyte solution to oxidation is enhanced. Accordingly, deterioration of battery when stored in high temperature atmosphere is prevented. As a result, an excellent battery having a high reliability is obtained.

Formula 1

In formula 1, $R_1$, $R_2$, $R_3$, $R_4$ are individually at least one selected from the group consisting of H, aryl group, and aryl group having a functional group containing a substituent having an electron attracting property, and the number of H substituent is three or less.

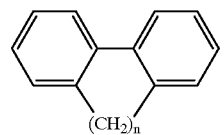

Formula 2

(n = 0~2)

REFERENCE NUMERALS

Figure 1:
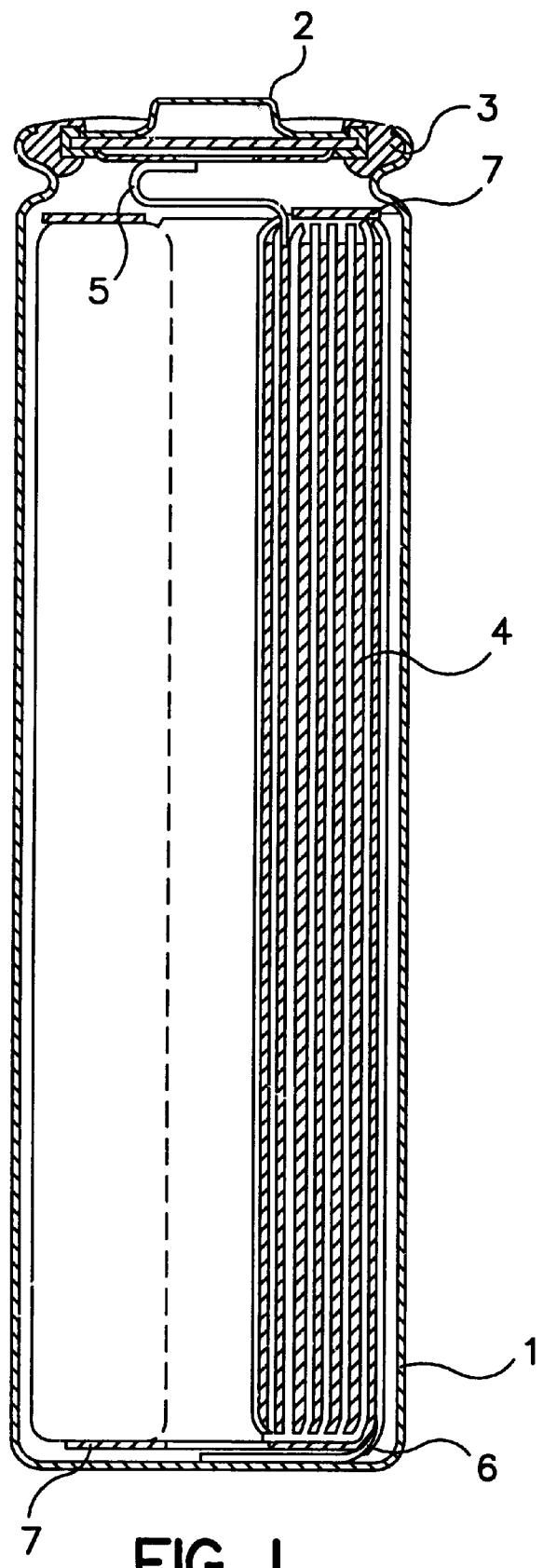
FIG. 1 is a longitudinal sectional view of a secondary battery in an embodiment of the invention.

1 Battery case
2 Sealing plate
3 Insulating packing
4 Plate group
5 Positive electrode lead
6 Negative electrode lead
7 Insulating ring

DETAILED DESCRIPTION OF THE INVENTION

The following have been known as a result of close examination about behavior of electro chemical oxidation of electrolytic solution. Electro chemical Oxidation occurs on the surface of a transition metal complex oxide containing lithium used as active material for positive electrode. The decomposed product contains lots of low molecular compounds. Such low molecular compounds are released outside of the electrolytic solution as gas, or dissolved in the electrolytic solution. When oxidation takes place in such manner, active centre of the positive electrode active material maintain a high activity without being poisoned. Accordingly, the decomposition reaction of oxidation of the electrolytic solution progresses continuously, and the electrolytic solution is exhausted, or decomposition gas is generated massively, which may possibly lead to elevation of internal pressure of the battery or leakage of electrolytic solution.

In the secondary battery of the invention, organic compounds expressed in formula 1 or formula 2 are added in the electrolytic solution. These organic compounds are likely to be oxidized and polymerized. By using the electrolyte solution containing such organic compounds, a protective film is formed at active centre of the positive electrode surface, and continuous oxidation of the electrolyte solvent is prevented.

Formula 1

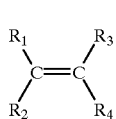

where $R_1$ to $R_4$: H, aryl group, or functional group having at least one or more electron attracting substituents bonded to an aryl group, and number of H substituent is three or less.

Formula 2

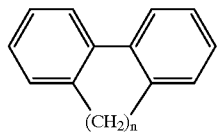

(n = 0~2)

The organic compound expressed in formula 1 is a compound having a vinyl group and plural aryl groups with a high pi-electron density, and having a flat structure. The organic compound expressed in formula 2 has biphenyl as its basic structure, and also has a chemical structure having an ortho position bonded cyclically. By this chemical structure, the organic compound expressed in formula 2 has a high pi-electron density, and has a flat structure. Such compound is likely to be oxidized and polymerized, and the product formed by oxidation is flat, and this product can cover the active centers of the positive electrode efficiently.

Preferably, the constitution is specified below.

As shown in formula 1, the aryl group has an electron attracting group such as halogen group, alkoxyl group, halogenated alkyl group, aryl group, hydroxyl group, amino group, carboxyl group, ester group, cyano group, or nitro group. This constitution facilitates oxidation and polymerization.

The active material for positive electrode of transition metal complex oxide containing lithium includes $Li_xCoO_2$, $Li_xNiO_2$ (U.S. Pat. No. 4,302,518), $Li_xMnO_2$, $Li_xCo_yNi_{1-y}O_2$ (Japanese Laid-open Patent No. 63-299056), $Li_xCo_fV_{1-f}O_z$, $Li_xNi_{1-y}M_yO_2$ (M=Ti, V, Mn, Fe), $Li_xCo_aNi_{b^-}M_cO_2$ (M=Ti, Mn, Al, Mg, Fe, Zr), $Li_xMn_2O_4$, and $Li_xMn_{2-y}M_yO_4$ (M=Na, Mg, Sc, Y, Fe, Co, Ni, Ti, Zr, Cu, Zn, Al, Pb, Sb). Herein, x=0 to 1.2, y=0 to 0.9, f=0.9 to 0.98, z=2.0 to 2.3, a+b+c=1, 0.a.1, 0.b.1, 0. c<1. The value of x is the value before start of charging and discharging, and this value of x charge or discharge by charging and discharging.

The negative electrode material is a compound capable of storing and releasing lithium ions, such as lithium, lithium alloy, alloy, intermetallic compound, carbon, organic compound, inorganic compound, metal complex, and organic high molecular compound. These substances are used either alone or in mixture.

As the alloy or intermetallic compound, a compound of transition metal and silicon, or a compound of transition metal and tin is used. In particular, a compound of nickel and silicon is preferable.

Examples of carbonaceous material include coke, pyrolytic carbons, natural graphite, artificial graphite, mesocarbon microbeads, graphitized mesophase spherule, vapor phase growth carbon, glassy carbon, carbon fiber (polyacrylonitrile, pitch, cellulose, vapor phase growth carbon), amorphous carbon, and organic matter baked carbon. These materials are used either alone or in mixture. In particular, graphite materials are preferred, such as graphitized material of mesophase spherule, natural graphite and artificial graphite. As carbonaceous materials, in addition to carbon, a material containing different compounds such as O, B, P, N, S, SiC, and B4C are used, and the content of such different compounds is preferred to be 0 to 10 wt. %.

As the inorganic compound, for example, tin compound or silicon compound is used.

The mean particle size of carbon material is preferred to be in a range of about 0.1 $\mu$m to about 60 $\mu$m, and more preferably about 0.5 $\mu$m to about 30 $\mu$m. The specific surface area is preferred to be about 1 $m^2/g$ to about 10 $m^2/g$. As a preferred crystal structure of graphite, the interval (d002) of hexagonal planes of carbon is about 3.35 Å to about 3.40 Å, and the size (Lc) of crystallite in the c-axis direction is 100 Å or more.

The electrolytic solution contains nonaqueous solvent and lithium salt to be dissolved in this solvent. As the nonaqueous solvent, cyclic carbonate, noncyclic carbonate, aliphatic ester carbonate, and others may be used. Examples of cyclic carbonate include ethylene carbonate (EC), propylene carbonate (PC), butylene carbonate (BC), and vinylene carbonate (VC). Examples of noncyclic carbonate include dimethyl carbonate (DMC), diethyl carbonate (DEC), ethyl methyl carbonate (EMC), and dipropyl carbonate (DPC). Examples of aliphatic ester carbonate include methyl formate, methyl acetate, methyl propionate, and ethyl propionate. More preferably, the nonaqueous solvent is mainly composed of a mixed system of a solvent containing at least cyclic carbonate, cyclic carbonate and noncyclic carbonate, or a mixed system of cyclic carbonate, noncyclic carbonate, and aliphatic ester carbonate.

As the electrolyte to be dissolved in these solvents, lithium salt such as $LiPF_6$ is preferred. The dissolving amount of lithium salt in the nonaqueous solvent is not particularly specified, but it is preferably about 0.2 mol/liter to about 2 mol/liter, and more preferably about 0.5 mol/liter to about 1.5 mol/liter.

As the positive electrode active material, at least one or more may be used as being selected from the group consisting of $Li_xCoO_2$, $Li_xNiO_2$, and $Li_xMn_2O_4$ (where 0.x.1). As the positive electrode current collector, a net, sheet, foil, lath or other shape made of stainless steel or aluminum may be used. As the negative electrode material, instead of lithium metal alone, at least one of alloy and carbonaceous material and lithium are used.

As the negative electrode current collector, a net, sheet, foil, lath or other shape made of stainless steel or copper may be used. As the electrode compound containing positive electrode active material or negative electrode material, binder, an electron conductor such as acetylene black or graphite is mixed.

Examples of binder include polyvinylidene fluoride, polytetrafluoroethylene or other thermoplastic compound containing fluorine, polymer containing acrylic acid, styrene butadiene rubber, ethylene propylene terpolymer, or other elastomer, which may be used either alone or in mixture.

The electrolytic solution contains at least (a) ethylene carbonate, (b) one or more of noncyclic carbonate such as diethyl carbonate, dimethyl carbonate, and ethyl methyl carbonate, or a mixed solvent of such noncyclic carbonate and methyl propionate, and (c) lithium salt such as $LiPF_6$ as electrolyte.

As the separator, polypropylene or polyethylene may be used either alone or in combination.

The shape of the battery is not particularly limited, but it may be formed in cylindrical, flat, prismatic thin, square or other shape.

The battery has means for assuring safety even in case of malfunction. The safety assuring means may include, for example, internal pressure relief safety valve, current shut-off safety valve or separator for raising resistance at high temperature.

Referring now to the drawing, a typical embodiment of the invention is described below.

(Exemplary Embodiment 1)

FIG. 1 is a longitudinal sectional view of a secondary battery in an embodiment of the invention. In FIG. 1, the secondary battery comprises a battery case 1, a sealing plate 2 having a safety valve, an insulating packing 3, a plate group 4, two insulating rings 7, a positive electrode lead 5, and a negative electrode lead 6. The battery case 1 is manufactured by processing a stainless steel plate having resistance to organic electrolyte solution. The sealing plate 2 is disposed so as to cover the opening of the battery case 1. The plate group 4 has a positive electrode and a negative electrode wound spirally plural times through a separator, and is contained in the case 1. The positive electrode lead 5 is drawn out of the positive electrode, and is connected to the sealing plate 2. The negative electrode lead 6 is drawn out of the negative electrode, and is connected to the bottom of the battery case 1. The first insulating ring 7 is disposed in the upper part of the plate group 4, and the second insulating ring is disposed in the lower part of the plate group 4.

The positive electrode is manufactured in the following process.

(a) A mixture of $Li_2CO_3$ and $Co_3O_4$ is baked at 900 for 10 hours, and $LiCoO_2$ powder is synthesized.

(b) A mixture is prepared by mixing $LiCoO_2$ powder, 3 wt. % of acetylene black, and 7 wt. % of fluorocarbon resin binder.

(c) This mixture is suspended in an aqueous solution of carboxy methyl cellulose, and positive electrode compound paste is prepared.

(d) The positive electrode compound paste is applied on an aluminum foil of 0.03 mm in thickness, and is dried and rolled.

In this process, a positive plate of 0.18 mm in thickness, 37 mm in width, and 390 mm in length was fabricated.

The negative electrode is manufactured in the following process.

(a) Mesophase graphite is prepared by graphitizing mesophase spherule at high temperature of 2800.

(b) A mixture is prepared by mixing 5 wt. % of styrene/butadiene rubber into this mesophase graphite.

(c) This mixture is suspended in an aqueous solution of carboxy methyl cellulose, and negative electrode compound paste is prepared.

(d) This negative electrode compound paste is applied on both side of a Cu foil of 0.02 mm in thickness, and dried and rolled.

Thus, a negative plate of 0.20 mm in thickness, 39 mm in width, and 420 mm in length was fabricated.

An aluminum lead is attached to the positive plate, and a nickel lead to the negative plate. The positive plate and negative plate were spirally wound through a polypropylene separator of 0.025 mm in thickness, 45 mm in width, and 950 mm in length, and put in a battery case of 17.0 mm in diameter and 50.0 mm in height.

The electrolytic solution was prepared in the following process.

(a) A mixed solvent is prepared by mixing 30 vol. % of ethylene carbonate, 50 vol. % of diethyl carbonate, and 20 vol. % of methyl propionate.

(b) In this mixed solvent, $LiPF_6$ is dissolved by 1 mol/liter.

(c) Further, an organic compound expressed in formula 1 or formula 2 is added by a rate of 2 wt. % to the total weight of the electrolytic solution. As the organic compound expressed in formula 1 or formula 2, one was selected from 1,2-diphenyl ethylene, cis-stilbene, trans-stilbene, triphenyl ethylene, tetraethyl phenylene, p-fluoro-cis-stilbene, biphenylene, and 9,10-dihydrophenanthrene. In this way, eight kinds of electrolytic solution were prepared.

Each one of these electrolytic solutions was poured into the battery case 1 containing the plate group 4, and the opening was sealed. Thus, eight batteries, No. 1 to No. 8, were fabricated.

(Comparative Example)

By using the electrolytic solution not containing the organic compound expressed in formula 1 or formula 2, battery No. 9 was prepared in the same method as in the embodiment. This is a comparative battery 9.

The following tests were conducted by using five cells each of batteries No. 1 to No. 8 of the embodiment and No. 9 of comparative battery. Each cell was charged at constant voltage of charging voltage of 4.2 V, and limiting current of 500 mA for 2 hours of charging time at the ambient temperature of 20. In thus charged cells, the discharge characteristic at 1 A was measured. The capacity was measured. Later, these cells were stored in a thermostatic oven at 80 in charged state for 15 days. Then, the stored cells were charged and discharged in the same condition as before storage, and the capacity after storage was measured. Thus, the capacity recovery rate after storage was calculated. The results are recorded in Table 1. The capacity recovery rate (or capacity maintenance rate) after storage was calculated in the following formula.

Capacity recovery rate (%)=(capacity after storage/capacity before storage)×100

TABLE 1

| o. | Organic compound added | Recovery rate after storage |
|---|---|---|
| | 1,2-diphenyl ethylene | 91.3 |
| | cis-stilbene | 93.8 |
| | Trans-stilbene | 94.9 |
| | Triphenyl ethylene | 92.9 |
| | Tetraethyl phenylene | 92.4 |
| | p-fluoro-cis-stilbene | 93.5 |

TABLE 1-continued

| o. | Organic compound added | Recovery rate after storage |
|---|---|---|
| | Biphenylene | 93.8 |
| | 9,10-dihydrophenanthrene | 91.5 |
| | None | 65.2 |

The following are known from Table 1. The batteries of the embodiment, No. 1 to No. 8, had the capacity recovery rate (capacity maintenance rate) of over 90%. By contrast, battery No. 9 not containing the organic compound in formula 1 or formula 2 had the capacity recovery rate of 65.2%. Thus, the batteries using the electrolytic solution containing the organic compound in formula 1 or formula 2 are known to have an excellent capacity recovery rate (capacity maintenance rate).

A next test was conducted to investigate the effects of the rate of content of the organic compound in formula 1 or formula 2. Using the same electrolytic solutions as in the embodiment, various batteries were fabricated. In this case, the contents of the organic compounds specified in the formulas in the total weight of the electrolytic solution were varied in a range of 0.05 wt. % to 30 wt. %. Using such batteries, the same test as in the embodiment was conducted. As a result, the batteries using the electrolytic solution with the content of organic compound of 0.1 wt. % and higher are known to have a particularly excellent capacity maintenance rate (capacity recovery rate) after storage. However, the batteries using the electrolytic solution containing the organic compound by over 20 wt. % were lowered in the discharge characteristic of the battery. This is considered because the electric conductivity of the electrolytic solution itself was decreased.

That is, when the organic compound expressed in formula 1 or formula 2 is contained in a range of about 0.1 wt. % to 20 wt. % in the total weight of the electrolytic solution, batteries having a particularly excellent high temperature storage characteristic are obtained.

As described herein, according to the constitution of the invention, batteries having excellent characteristics are obtained even when stored in high temperature atmosphere.

What is claimed is:
1. A secondary battery comprising:
  a positive electrode comprising a positive electrode active material;
  a negative electrode comprising a negative electrode material; and
  a electrolytic solution comprising a nonaqueous solvent and at least one organic compound selected from the group consisting of:

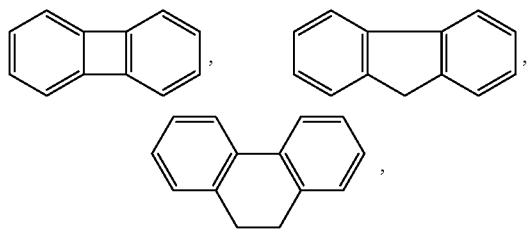

and compounds represented by formula 1:

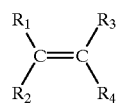

formula 1 in which:
  $R_1$, $R_2$, $R_3$, and $R_4$ are each independently (i) hydrogen, (ii) an aryl group, or (iii) an aryl group having a functional group containing a substituent having an electron attracting property; and
  at least one of $R_1$, $R_2$, $R_3$, and $R_4$ is either (ii) an aryl group, or (iii) an aryl group having a functional group containing a substituent having an electron attracting property; in which:
  the positive electrode active material comprises a transition metal complex oxide comprising lithium: and
  the negative electrode material comprises a material capable of storing and releasing lithium ions.

2. The secondary battery of claim 1 in which:
  the positive electrode active material comprises a transition metal complex oxide comprising lithium: and
  the negative electrode material comprises a material capable of storing and releasing lithium ions.

3. The secondary battery of claim 1 in which the functional group containing a substituent having an electron attracting property is selected from the group consisting of halogen, alkoxy, halogenated alkyl, aryl, hydroxyl, amino, carboxyl, ester, cyano, and nitro.

4. The secondary battery of claim 1 in which the at least one organic compound is oxidized and polymerized.

5. The secondary battery of claim 1 in which the positive electrode comprises a protective film formed by oxidation or polymerization of the at least one organic compound.

6. A secondary battery comprising:
  a positive electrode comprising a positive electrode active material;
  a negative electrode comprising a negative electrode material; and
  a electrolytic solution comprising a nonaqueous solvent and at least one organic compound selected from the group consisting of:

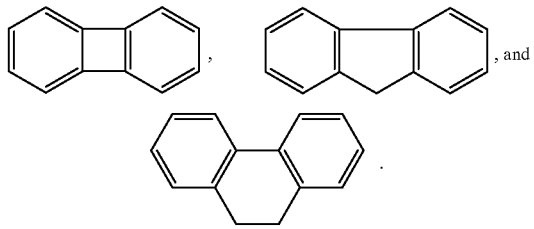

7. The secondary battery of claim 6 in which the at least one organic compound is oxidized and polymerized.

8. The secondary battery of claim 6 in which the positive electrode comprises a protective film formed by oxidation or polymerization of the at least one organic compound.

9. The secondary battery of claim 6 in which the at least one organic compound is biphenylene or 9,10-dihydrophenanthrene.

10. The secondary battery of claim 6 in which the at least one organic compound comprises about 0.1 wt % to about 20 wt % of the electrolytic solution.

11. The secondary battery of claim 6 in which:
the negative electrode material comprises a compound capable of storing and releasing lithium; and
the electrolytic solution comprises a lithium salt.

12. The secondary battery of claim 11 in which the at least one organic compound comprises about 0.1 wt % to about 20 wt % of the electrolytic solution.

13. The secondary battery of claim 11 in which the at least one organic compound comprises about 0.1 wt % to about 20 wt % of the electrolytic solution.

14. A secondary battery comprising:
a positive electrode comprising a positive electrode active material;
a negative electrode comprising a negative electrode material; and
a electrolytic solution comprising a nonaqueous solvent and at least one organic compound selected from the group consisting of:

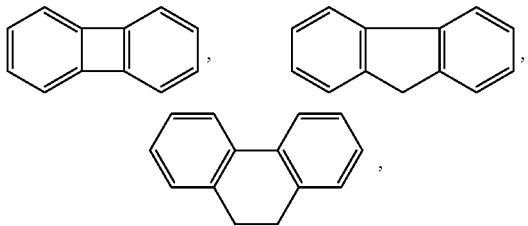

and compounds represented by formula 1:
formula 1

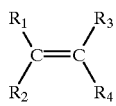

formula 1 in which:
$R_1$, $R_2$, $R_3$, and $R_4$ are each independently (i) hydrogen, (ii) an aryl group, or (iii) an aryl group having a functional group containing a substituent having an electron attracting property; and
at least one of $R_1$, $R_2$, $R_3$, and $R_4$ is either (ii) an aryl group, or (iii) an aryl group having a functional group containing a substituent having an electron attracting property; in which:
the positive electrode active material comprises a transition metal complex oxide comprising lithium: and
the negative electrode material comprises a material capable of storing and releasing lithium ions;
the positive electrode active material comprises at least one material selected from the group consisting of $Li_xCoO_2$, $Li_xNiO_2$, $Li_xMnO_2$, $Li_xCo_yNi_{1-y}O_2$, $Li_xCo_fV_{1-f}O_z$, $Li_xNi_{1-y}M^1_yO_2$, $Li_xCo_aNi_bM^2_cO_2$, $Li_xMn_2O_4$, and $Li_xMn_{2-y}M^3_yO_4$;
in which:
x is 0 to 1.2;
y is 0 to 0.9;
f is 0.9 to 0.98;
z is 2.0 to 2.3;
a+b+c=1, $0 \leq a \leq 1$, $0 \leq b \leq 1$, and $0 \leq c \leq 1$;
$M^1$ is Ti, V, Mn, or F;
$M^2$ is Ti, Mn, Al, Mg, Fe, or Zr;
$M^3$ is Na, Mg, Sc, Y, Fe, Co, Ni, Ti, Zr, Cu, Zn, Al, Pb, or Sb; and
the value of x is the value before start of charging and discharging, and the value of x decreases or increases by charging and discharging.

15. The secondary battery of claim 11 in which:
the negative electrode material comprises at least one material selected from the group consisting of lithium, lithium alloys, alloys, intermetallic compounds, carbon, organic compounds, inorganic compounds, metal complexes, and organic high molecular weight compounds; and
the negative electrode material comprises a compound capable of storing and releasing lithium.

16. The secondary battery of claim 1 in which:
the negative electrode material comprises at least one material selected from the group consisting of lithium, lithium alloys, alloys, intermetallic compounds, carbon, organic compounds, inorganic compounds, metal complexes, and organic high molecular weight compounds; and
the negative electrode material comprises a compound capable of storing and releasing lithium.

17. The secondary battery of claim 1 in which:
the nonaqueous solvent comprises (a) a cyclic carbonate, (b) a mixture of a cyclic carbonate and noncyclic carbonate, or (c) a mixture of a cyclic carbonate, noncyclic carbonate, and an aliphatic ester carbonate;
the cyclic carbonate comprises at least one carbonate selected from the group consisting of ethylene carbonate, propylene carbonate, butylene carbonate, and vinylene carbonate;
the noncyclic carbonate comprises at least one carbonate selected from the group consisting of dimethyl carbonate, diethyl carbonate, ethyl methyl carbonate, and dipropyl carbonate; and
the aliphatic ester carbonate comprises at least one carbonate selected from the group consisting of methyl formate, methyl acetate, methyl propionate, and ethyl propionate.

18. The secondary battery of claim 1 in which the electrolytic solution comprises a lithium salt.

19. The secondary battery of claim 1 in which the at least one organic compound has formula 1.

20. The secondary battery of claim 19 in which the at least one organic compound is oxidized and polymerized.

21. The secondary battery of claim 19 in which the positive electrode comprises a protective film formed by oxidation or polymerization of the at least one organic compound.

22. The secondary battery of claim 19 in which the at least one organic compound comprises about 0.1 wt % to about 20 wt % of the electrolytic solution.

23. A secondary battery comprising:
a positive electrode comprising a positive electrode active material;
a negative electrode comprising a negative electrode material; and
a electrolytic solution comprising a nonaqueous solvent and at least one organic compound selected from the group consisting of 1,2-diphenyl ethylene, cis-stilbene, trans-stilbene, triphenyl ethylene, tetraphenyl ethylene, and p-fluoro-cis-stilbene.

24. The secondary battery of claim 23 in which the at least one organic compound is oxidized and polymerized.

25. The secondary battery of claim 23 in which the positive electrode comprises a protective film formed by oxidation or polymerization of the at least one organic compound.

26. The secondary battery of claim 23 in which the at least one organic compound comprises about 0.1 wt % to about 20 wt % of the electrolytic solution.

27. The secondary battery of claim 23 in which:

the negative electrode material comprises a compound capable of storing and releasing lithium; and the electrolytic solution comprises a lithium salt.

28. The secondary battery of claim 27 in which the at least one organic compound comprises about 0.1 wt % to about 20 wt % of the electrolytic solution.

29. The secondary battery of claim 28 in which the at least one organic compound comprises cis-stilbene.

30. A secondary battery comprising:

(a) a positive electrode active material comprising $Li_xCoO_2$, in which x is 0 to 1.2;

(b) a negative electrode material comprises graphite;

(c) an electrolytic solution comprising lithium hexafluorophosphate, a nonaqueous solvent, and an organic compound:

in which:

the nonaqueous solvent comprises ethylene carbonate and at least one noncyclic carbonate selected from the group consisting of dimethyl carbonate, diethyl carbonate, and ethyl methyl carbonate; and the organic compound comprises cis-stilbene.

31. The secondary battery of claim 30 in which the cis-stilbene comprises about 0.1 wt. % to about 20 wt. % of the electrolyte solution.

32. The secondary battery of claim 30 in which the at least one organic compound is oxidized and polymerized.

33. The secondary battery of claim 30 in which the positive electrode comprises a protective film formed by oxidation or polymerization of the at least one organic compound.

* * * * *

UNITED STATES PATENT AND TRADEMARK OFFICE
CERTIFICATE OF CORRECTION

PATENT NO. : 6,303,250 B1　　　　　　　　　　　　　　　　　　　　　　　　Page 1 of 1
DATED : October 16, 2001
INVENTOR(S) : Shoichiro Watanabe, Kazuya Iwamoto, Atsushi Ueda, Jun Nunome and Hizuru Koshina It is certified that error appears in the above-identified patent and that said Letters Patent is hereby corrected as shown below:

Column 9,
Line 8, please delete "11" and insert -- 1 --.

Column 10,
Line 7, please delete "15" and insert -- 14 --.

Signed and Sealed this

Twelfth Day of November, 2002

Attest:

Attesting Officer

JAMES E. ROGAN
Director of the United States Patent and Trademark Office